United States Patent
Lei et al.

(10) Patent No.: US 12,246,381 B2
(45) Date of Patent: Mar. 11, 2025

(54) METHOD FOR PREFABRICATING AIR HOLE DEFECT BY MEANS OF CONTROLLED SLM PROCESS

(71) Applicants: AECC SHANGHAI COMMERCIAL AIRCRAFT ENGINE MANUFACTURING CO., LTD., Shanghai (CN); AECC COMMERCIAL AIRCRAFT ENGINE CO., LTD., Shanghai (CN)

(72) Inventors: Liming Lei, Shanghai (CN); Yali Li, Shanghai (CN); Yanli He, Shanghai (CN); Xiaohui Chen, Shanghai (CN); Jun Fu, Shanghai (CN)

(73) Assignees: AECC SHANGHAI COMMERCIAL AIRCRAFT ENGINE MANUFACTURING CO., LTD., Shanghai (CN); AECC COMMERCIAL AIRCRAFT ENGINE CO., LTD, Shanghai (CN)

( * ) Notice: Subject to any disclaimer, the term of this patent is extended or adjusted under 35 U.S.C. 154(b) by 183 days.

(21) Appl. No.: 17/920,545

(22) PCT Filed: Dec. 21, 2020

(86) PCT No.: PCT/CN2020/137881
§ 371 (c)(1),
(2) Date: Oct. 21, 2022

(87) PCT Pub. No.: WO2021/212887
PCT Pub. Date: Oct. 28, 2021

(65) Prior Publication Data
US 2023/0141551 A1    May 11, 2023

(30) Foreign Application Priority Data
Apr. 22, 2020  (CN) .......................... 202010319637.2

(51) Int. Cl.
*B22F 10/28*    (2021.01)
*B22F 10/366*    (2021.01)
(Continued)

(52) U.S. Cl.
CPC ............ *B22F 10/28* (2021.01); *B22F 10/366* (2021.01); *B22F 10/38* (2021.01); *B33Y 10/00* (2014.12); *B33Y 50/02* (2014.12)

(58) Field of Classification Search
CPC ........ B22F 12/43; B22F 10/366; B22F 10/38; B22F 3/1103; B22F 10/28; B33Y 10/00; B33Y 80/00; B33Y 50/02; Y02P 10/25
See application file for complete search history.

(56) References Cited

U.S. PATENT DOCUMENTS

| 2016/0184893 A1 | 6/2016 | Dave et al. |
| 2017/0291367 A1 | 10/2017 | Burlatsky et al. |
| 2018/0185965 A1 | 7/2018 | Victor et al. |

FOREIGN PATENT DOCUMENTS

| CN | 108436081 A | 8/2018 |
| CN | 108817386 A | 11/2018 |
| CN | 109462986 A | 3/2019 |
| CN | 111203536 A | 5/2020 |
| WO | 2018237171 A1 | 12/2018 |

OTHER PUBLICATIONS

International Search Report (with English Translation) and Written Opinion (with Machine Translation) issued on Mar. 22, 2021, in corresponding International Application No. PCT/CN2020/137881; 15 pages.

(Continued)

Primary Examiner — Monica A Huson
(74) Attorney, Agent, or Firm — Maier & Maier, PLLC

(57) ABSTRACT

A method for prefabricating pore defects by controlling a SLM process, including performing laser scanning on a specified metal melt layer (LY) according to a first scan path (P1) and a second scan path. The first scan path (P1) and the (Continued)

second scan path (P2) have a path overlap zone (A0), the path overlap zone (A0) has a predetermined width, and laser energy input superimposed in the path overlap zone (A0) is controlled to reach a predetermined energy value, whereby keyholes are formed at a plurality of positions in a lengthwise direction of the path overlap zone (A0), the specified metal melt layer (LY) is taken as a defect layer, and the keyholes in the path overlap zone (A0) is taken as pore defects.

6 Claims, 7 Drawing Sheets

(51) Int. Cl.
  *B22F 10/38* (2021.01)
  *B33Y 10/00* (2015.01)
  *B33Y 50/02* (2015.01)

(56) References Cited

OTHER PUBLICATIONS

Zhang et al., "Microstructure and mechanical properties of Hastelloy-X produced by selective laser melting"; IOP Conference Series: Materials Science and Engineering; 2020; vol. 768, pp. 1-9.
Search Report issued on May 30, 2020, in corresponding Chinese Application No. 2020103196372, 5 pages.
Zhang et al., "Anisotropy of Microstructure and Mechanical Properties of Hastelloy X Alloy Produced by Selective Laser Melting", Journal of Aeronautical Materials, 2018, vol. 38, No. 6, pp. 50-56; English language abstract provided.
Extended European Search Report issued on Apr. 19, 2024, in corresponding European Application No. 20932468.0, 8 pages.
Yang et al., "Porosity formation mechanisms and fatigue response in Al—Si—Mg alloys made by selective laser melting", Materials Science, Nov. 21, 2017, vol. 712, pp. 166-174.
Wang, "Mechanical property study on rapid additive layer manufacture Hastelloy® X alloy by selective laser melting technology", The International Journal of Advanced Manufacturing Technology, Jun. 12, 2011, vol. 58, No. 5-8, pp. 545-551.

METHOD FOR PREFABRICATING AIR HOLE DEFECT BY MEANS OF CONTROLLED SLM PROCESS

TECHNICAL FIELD

This disclosure relates to a method for prefabricating pore defects by controlling the selective laser melting (SLM) process, which can be exemplarily used for non-destructive testing SLM parts, evaluating the influence of defects on the performance of components, and the like.

BACKGROUND

Additive manufacturing (AM), also referred to as 3D printing, is a manufacturing technology of component shaping by melting raw materials layer by layer based on the principle of discrete stacking. SLM technology is considered to be one of the most potential AM technologies. Since the laser beam with a fine focusing spot is adopted as the shaping energy source, the high-speed and high-precision scanning galvanometer is adopted as the processing beam control unit, and a thinner layer thickness control technology is adopted, compared with other AM technologies, SLM technology has more advantages in obtaining high-density and high-precision shaping pieces, is capable of completing the direct shaping of complex-cavity, complex-profile, thin-walled and variable-section components, and is widely applied in the field such as aerospace, such as aero-engine pre-swirl nozzles, fuel nozzles and turbine blades.

Due to the complex phase transition process of rapid melting and solidification of the metal powder material in the SLM process, SLM parts are prone to have typical defects such as pores, cracks and incomplete fusion. At present, non-destructive testing methods such as industrial CT testing, ultrasonic testing, radiographic testing, fluorescent penetrant testing, etc., are widely adopted in SLM parts for aerospace to detect the characteristics of components, such as defect position and size, to analyze and evaluate whether the components meet the requirements of use. However, due to the different structures and defect characteristics between the AM part and the traditional parts, such as inhomogeneity and anisotropy, as well as the complex geometry, traditional non-destructive testing processes may have problems such as poor accessibility and large detection blind zones. Therefore, the non-destructive testing technology for traditional parts cannot be simply followed. It needs to re-analyze the correspondence between the structure characteristics and non-destructive testing signals, clarify the non-destructive testing signal characteristics of typical defects, and select the applicable non-destructive testing methods and process parameters according to the complexity of the geometric structure. For example, industrial CT can detect defects such as pores, cracks, and incomplete fusion in AM parts, and can give tomographic images of the detected pieces. Before CT testing, a defect-contained comparative analysis sample needs to be prepared, by combining the material, structure, expectedly detected defect size, etc. of the detected piece, and reasonable detection process parameters need to be set then. The comparative analysis sample affects the setting of the detection process parameters, and affects the defect detection of the subsequent detected pieces. The closer the material, shaping process, defects, etc. of the sample are to the detected piece, the better the detection effect can be obtained. Therefore, for the detected AM part, the comparative analysis sample thereof should also be prepared by the AM process, and the related defects should be prefabricated.

At present, the method of prefabricating pore defects inside the AM part mainly comprises designing pores of certain sizes at specific positions at the 3D model design stage, and then additively shaping the part with pore features. However, due to the limitations of the AM technology itself, the designed pore features are easily filled by molten metal liquid during shaping. Therefore, it is difficult to use this method to successfully prefabricate pore defects. In view of the shortages of the existing methods, this disclosure provides a method for prefabricating pore defects by controlling a SLM process.

SUMMARY

An object of this disclosure is to provide a method for prefabricating pore defects, which can utilize the "keyhole effect" to prefabricate pore defects in a SLM part by controlling the SLM process.

A further object of this disclosure is to provide a method for prefabricating pore defects, which can form pore defects with characteristic of additive manufacturing metallurgical defects in the SLM part, by controlling the SLM process.

This disclosure provides a method for prefabricating pore defects by controlling a SLM process, comprising: performing laser scanning on a specified metal melt layer according to a first scan path; and performing laser scanning on the specified metal melt layer according to a second scan path; wherein the first scan path and the second scan path have a path overlap zone, the path overlap zone has a predetermined width, and laser energy input superimposed in the path overlap zone is controlled to reach a predetermined energy value, whereby keyholes are formed at a plurality of positions in a lengthwise direction of the path overlap zone, the specified metal melt layer is taken as a defect layer, and the keyholes in the path overlap zone are taken as pore defects.

In an embodiment, the laser scanning along the first scan path and the second scan path adopts a strip-type laser scanning manner; the first scan path is located in a first strip zone, the second scan path is located in a second strip zone, the first strip zone and the second strip zone form a strip lap-joint zone, the strip lap-joint zone constitutes the path overlap zone, and a strip lap joint amount of the strip lap joint zone is a width of the path overlap zone.

In an embodiment, the first scan path comprises a plurality of first scan lines arranged in parallel and spaced equidistantly, the second scan path comprises a plurality of second scan lines arranged in parallel and spaced equidistantly, and scan pitches of the first scan path and the second scan path are the same.

In an embodiment, the laser scanning along the first scan path and the second scan path adopts a strip-type laser reciprocating scanning manner.

In an embodiment, the laser scanning along the first scan path and the second scan path adopts a laser pulse exposure mode.

In an embodiment, SLM process parameters are controlled as follows: shaping material adopts Hastelloy X alloy; laser scan power P=180-210 W; scan line dot spacing D=80-100 μm; scan line exposure time t=70-90 μs.

In an embodiment, the SLM process parameters are further controlled as follows: layer thickness d=30 nm; scan pitch h=70-100 nm; strip lap-joint amount δ=0.5-0.9 mm.

In an embodiment, position, quantity and length of the strip lap-joint zone in the defect layer are controlled by changing laser scan direction and strip widths of the first strip zone and/or the second strip zone, thereby controlling a pore defect proportion of the defect layer.

In an embodiment, the pore defect proportion a of the defect layer is determined with reference to the following formula:

$$a=(N\times(\pi R^2)\times L/h)/S$$

wherein N is a quantity of the strip lap-joint zone, R is a pore radius, L is a length of the strip lap-joint zone, h is the scan pitch, and S is a sectional area of the defect layer.

The above pore defect prefabrication method utilizes the "keyhole effect" to prefabricate pore defects in the SLM part, wherein the "keyhole effect" can be created by controlling the shaping process parameters, prefabricating enclosed pore group at specified position of the SLM part; and the pore defect position and the pore defect proportion can also be controlled by the shaping process parameters.

By performing the above pore defect prefabrication method, pores can be successfully obtained in the SLM part, and the shape and size of the pores are characteristic of additive manufacturing metallurgical defects. The above pore defect prefabrication method does not destroy the structure of the SLM part, and retains its characteristics such as inhomogeneity and anisotropy. When the SLM part, in which the defects are prefabricated by the above pore defect prefabrication method, is adopted for comparative analysis, it is beneficial to analyze the real correspondence between the pore defects of the SLM part and the non-destructive testing signals or the performance of the part, which helps obtain a better detection effect.

In addition, by means of the above pore defect prefabrication method, pores can be prefabricated in key positions of a SLM part or the typical characteristic sample thereof, so as to carry out strength assessment tests such as tensile, endurance, and fatigue. The obtained performance assessment results can be used for actual analysis and research about the relationship between the pore defects and the part performance, providing a strong theoretical support for the application of SLM parts.

BRIEF DESCRIPTION OF THE DRAWINGS

The above and other features, properties and advantages of this disclosure will become more apparent from the following description in conjunction with the accompanying drawings and embodiments, wherein.

DETAILED DESCRIPTION

This disclosure will be further described below in conjunction with the specific embodiments and the accompanying drawings. More details are set forth in the following description to facilitate a full understanding of this disclosure, but it is obvious that this disclosure can be implemented in many other ways that are different from those described herein. Those skilled in the art can make similar promotions and deductions according to the actual application situation without violating the connotation of this disclosure. Therefore, the content of this specific embodiment should not limit the protection scope of this disclosure.

Figure 1:
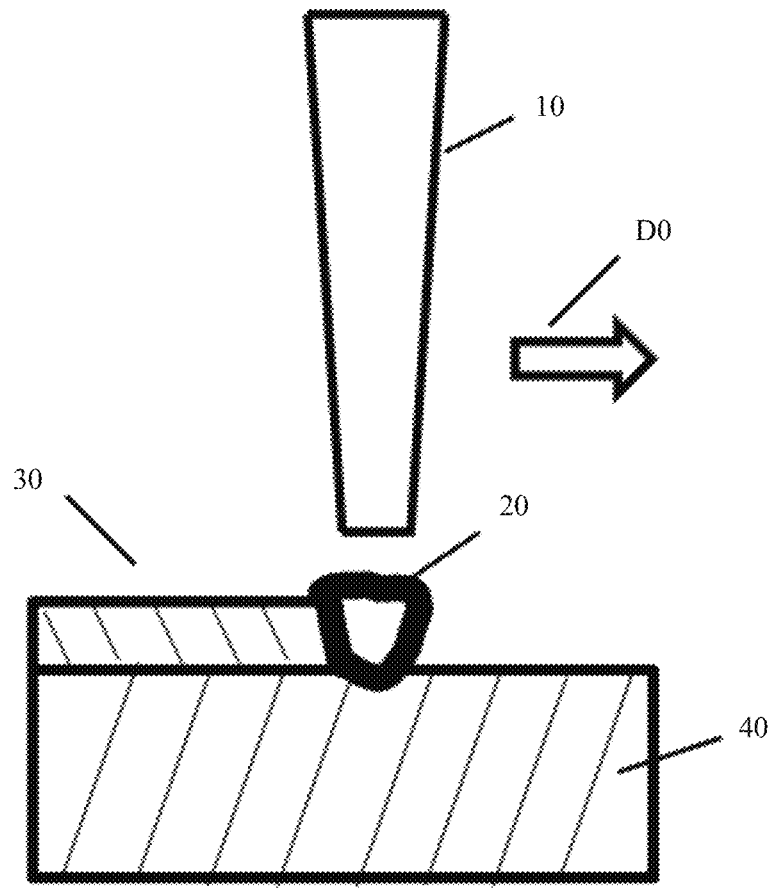
FIG. 1 is a schematic diagram of a normal molten pool.
Figure 2:
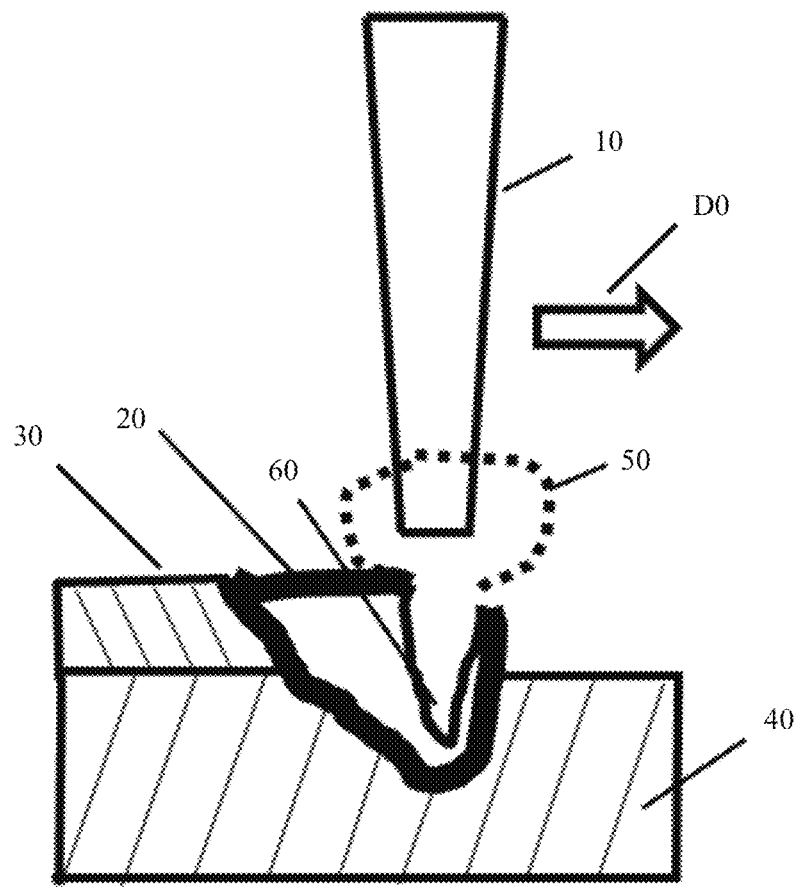
FIG. 2 is a schematic diagram of a molten pool formed with a keyhole.

In conjunction with FIG. 1 and FIG. 2, a schematic diagram of the principle of the keyhole effect is shown. Wherein, FIG. 1 schematically shows a normal molten pool, and FIG. 2 schematically shows the keyhole formed in the molten pool.

As shown in FIG. 1, when the energy density of the incident laser 10 lies within a suitable process range, the formed molten pool 20 is relatively stable and the metallurgical quality is good. The figure also shows the laser scan direction DO of the laser 10, the metal melt layer 30 being melted and shaped through SLM, and the base material 40 already molten and shaped through SLM.

As shown in FIG. 2, when the energy density of the incident laser 10 is increased to a critical energy value, the surface of the material vaporizes and forms plasma 50. Under the reaction force of the vapor, a keyhole 60 is formed inside the molten metal. Then, the metal liquid moves under the action of Marangoni convection and surface tension, etc. in the molten pool, wraps and fills the keyhole 60. Gas that is too late to escape is enclosed in the solidified part to form pores.

When the laser 10 moves to the next position along the laser scan direction DO, the laser energy at the critical energy value is still surrounded by the agglomerated plasma 50 at this time, so that the energy of the laser 10 incident on the powder material is lower than the critical energy value, and keyholes cannot be formed. After the laser 10 continues to move out of the range of the agglomerated plasma 50, the energy density of the laser 10 will reach the critical energy value again, and forms a keyhole 60 that acts as the pore defect in the part again, i.e., the pore defect is prefabricated in the part. Therefore, the pore defects formed by the keyhole effect have a certain periodicity.

This disclosure provides a method for prefabricating pore defects in a SLM part by utilizing the keyhole effect, also referred as a method for prefabricating pore defects by controlling the SLM process.

Figure 3:
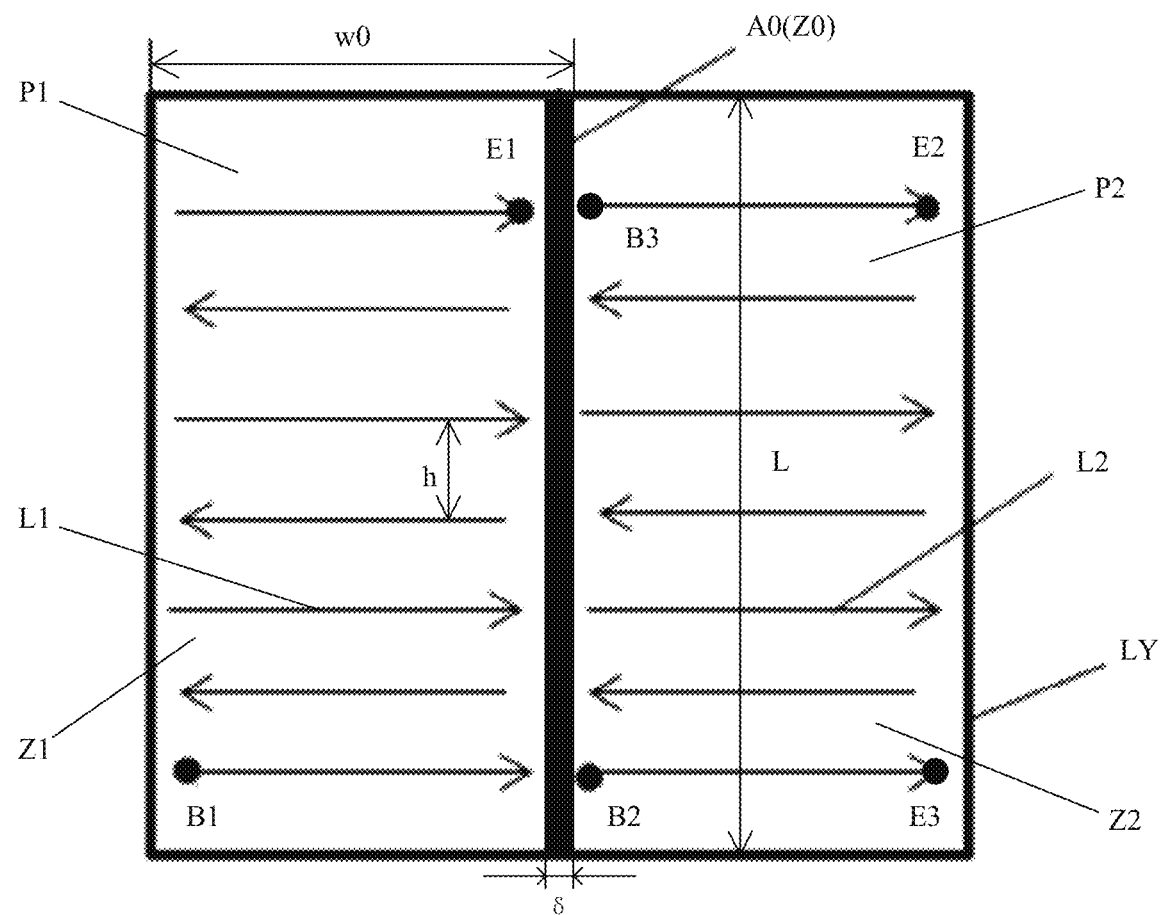
FIG. 3 is a schematic diagram of an exemplary laser scan strategy.

Referring to FIG. 3, in the pore defects prefabrication method according to this disclosure, laser scanning is performed on a specified metal melt layer LY according to the first scan path P1, and laser scanning is performed on the specified metal melt layer LY according to the second scan path P2. Wherein, the first scan path P1 and the second scan path P2 have a path overlap zone A0, the path overlap zone A0 has a predetermined width, and the laser energy input superimposed in the path overlap zone A0 is controlled to reach a predetermined energy value, whereby keyholes are formed at a plurality of positions in the lengthwise direction of the path overlap zone A0, the specified metal melt layer LY is taken as a defect layer, and the keyholes in the path overlap zone A0 is taken as pore defects.

The SLM process is to melt and solidify the component layer by layer, in which the metallurgical structure of the specified metal melt layer LY can be changed by changing the SLM process parameters thereof. Therefore, by setting the SLM process parameters for generating the keyhole for the specified metal melt layer LY, or by changing the height of the specified metal melt layer LY in the above pore defect prefabrication method, the position of the pore defect in the height direction can be controlled.

In the exemplary embodiment shown in FIG. 3, the laser scanning along the first scan path P1 and the second scan path P2 may adopt a strip-type laser scanning manner. The first scan path P1 is located in the first strip zone Z1 (on the left in FIG. 3), and the second scan path P2 is located in the second strip zone Z2 (on the right in FIG. 3).

The first strip zone Z1 and the second strip zone Z2 form a strip lap-joint zone Z0. The strip lap joint zone Z0 constitutes the path overlap zone A0 of the first scan path P1 and the second scan path P2. The strip lap joint amount δ of the strip lap-joint zone Z0 is the width of the path overlap zone A0. The lap-joint length L of the strip lap-joint zone Z0 is namely the length of the path overlap zone A0.

The first scan path P1 may comprise a plurality of first scan lines L1 arranged in parallel and spaced equidistantly, and the second scan path P2 may comprise a plurality of second scan lines L2 arranged in parallel and spaced equidistantly. Scan pitches of the first scan path P1 and the second scan path P2 are the same, and both are the scan pitch h. The scan pitch h refers to the pitch between two adjacent first scan lines L1 (or two adjacent second scan lines L2).

Further, the laser scanning along the first scan path P1 and the second scan path P2 may adopt a strip-type laser reciprocating scanning manner. In other words, the scan directions indicated by two adjacent first scan lines L1 are opposite, and the scan directions indicated by two adjacent second scan lines L2 are opposite.

Specifically, with respect to FIG. 3, in the pore defect prefabrication method, the strip-type laser reciprocating scanning is performed. The laser scans the first strip zone Z1 from the first start point B1 on the left to the first end point E1 according to the first scan path P1, and then scans the second strip zone Z2 from the second start point B2 on the right to the second end point E2 according to the second scan path P2.

In another embodiment, the laser may scan the first strip zone Z1 from the first start point B1 on the left to the first end point E1 in the strip-type laser reciprocating scanning manner, and then continue to scan the second strip zone Z2 from the third start point B3 on the right to the third end point E3 in the strip-type laser reciprocating scanning manner. Compared with the case in which the laser returns to the second start point B2 to start scanning the second strip zone Z2, the third start point B3 is closer to the first end point E1, so that start scanning the second strip zone Z2 from the third start point B3 is beneficial to improve efficiency.

At the location where the first strip zone Z1 and the second strip zone Z2 are lap-joined, a strip lap joint zone Z0 having a certain lap joint amount (strip lap-joint amount δ) is formed. The strip lap-joint zone Z0 is melted twice by the laser: after the laser scans the first strip zone Z1, the strip lap-joint zone Z0 is melted and solidified rapidly with a temperature rise; when the laser scans the second strip zone Z2, the strip lap-joint zone Z0 is secondly scanned, and a melting behavior occurs in the strip lap joint zone Z0 again. For example, by controlling the shaping process parameters to make the laser energy input twice superimposed in the strip lap-joint zone Z0 reach a predetermined energy value, or reach a vaporizing condition of the metal material, keyholes will be formed in the strip lap joint zone Z0 at this time, thereby leaving pore defects.

Figure 4:
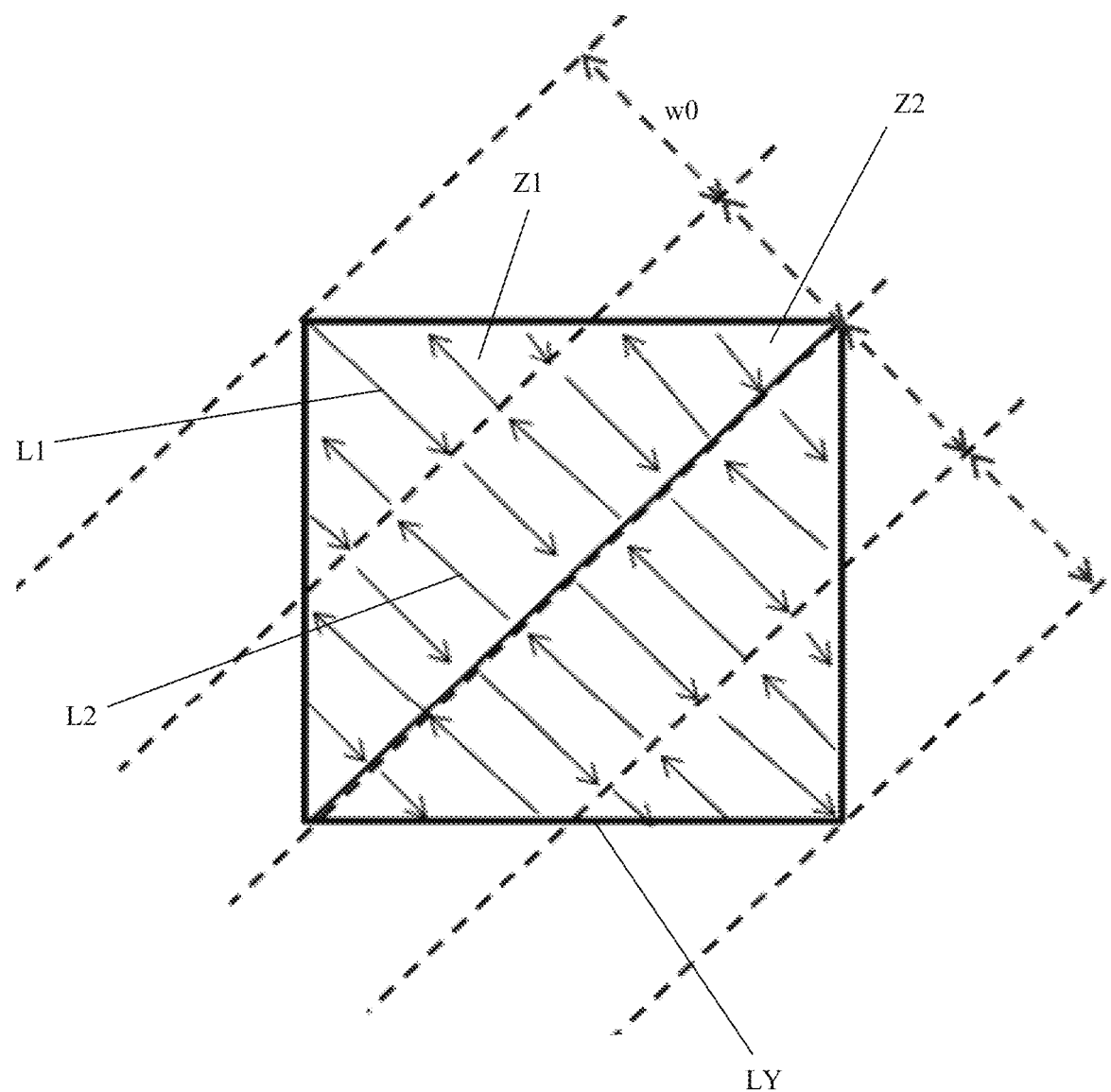
FIG. 4 is a schematic diagram of another exemplary laser scan strategy.

The strip laser scanning manner is a zone-wise scanning manner. The principle thereof is to divide the section of the component model into a plurality of strip zones, and then scan the laser zone by zone according to the section information of the component model, in which the scanned zone is rapidly melted and solidified. The width of one strip zone may be referred to as the strip width. Preferably, the strip widths of all strip zones are the same, as shown in FIG. 3, FIG. 4 and the following FIG. 5, FIG. 7, FIG. 9. In FIG. 3 and FIG. 4, the first strip zone Z1 is taken as an example to show the strip width w0.

In the pore defect prefabrication method, the position, quantity and length of the strip lap joint zone Z0 in the above defect layer may be controlled by changing the laser scan direction and the strip width w0 (the strip width of the first strip zone Z1 and/or the second strip zone Z2), thereby controlling a pore defect proportion a of the above defect layer. For example, in the embodiment shown in FIG. 3, the section of the component model is divided into two strip zones. Whereas, in the embodiment shown in FIG. 4, for the same section of the component model, the strip width w0 is changed, the section of the component model is divided into four strip zones, and the laser scan direction is changed.

As described above, the scan pitches of the first scan path P1 and the second scan path P2 are the same, and both are the scan pitch h. With respect to FIG. 3, the pore defect proportion a (or the pore defect rate) of the defect layer can be determined with reference to the following formula or approximately according to the following formula:

$$a = (N \times (\pi R^2) \times L/h)/S \quad (1)$$

wherein N is the quantity of the strip lap-joint zone Z0, R is the pore radius, L is the length of the strip lap joint zone Z0, h is the scan pitch, and S is the sectional area of the above defect layer.

The parameters can be adjusted with reference to the above formula (1), so as to obtain the desired pore defect proportion a of the defect layer.

The laser scanning along the first scan path P1 and the second scan path P2 may adopt a laser pulse exposure mode. According to experiments, the inventor found that compared with the laser continuous exposure mode, the "keyhole effect" is more likely to occur in the laser pulse exposure mode.

Examples of this disclosure are provided below. It should be appreciated that the latter example may use the element numbers and part of the contents in the previous example, wherein the same numbers are used to represent the same or similar elements, and the description of the same technical contents is selectively omitted. Regarding the description of the omitted part, reference may be made to the previous example, and the description of the latter example would not be repeated. In addition, in the provided first to third examples, various process parameters of the first strip zone Z1 and the second strip zone Z2 are the same, and the second scan path P2 in the second strip zone Z2 may be substantially equivalent to that formed by offsetting the first scan path P1 in the first strip zone Z1 by a predetermined distance.

First Example

Figure 5:
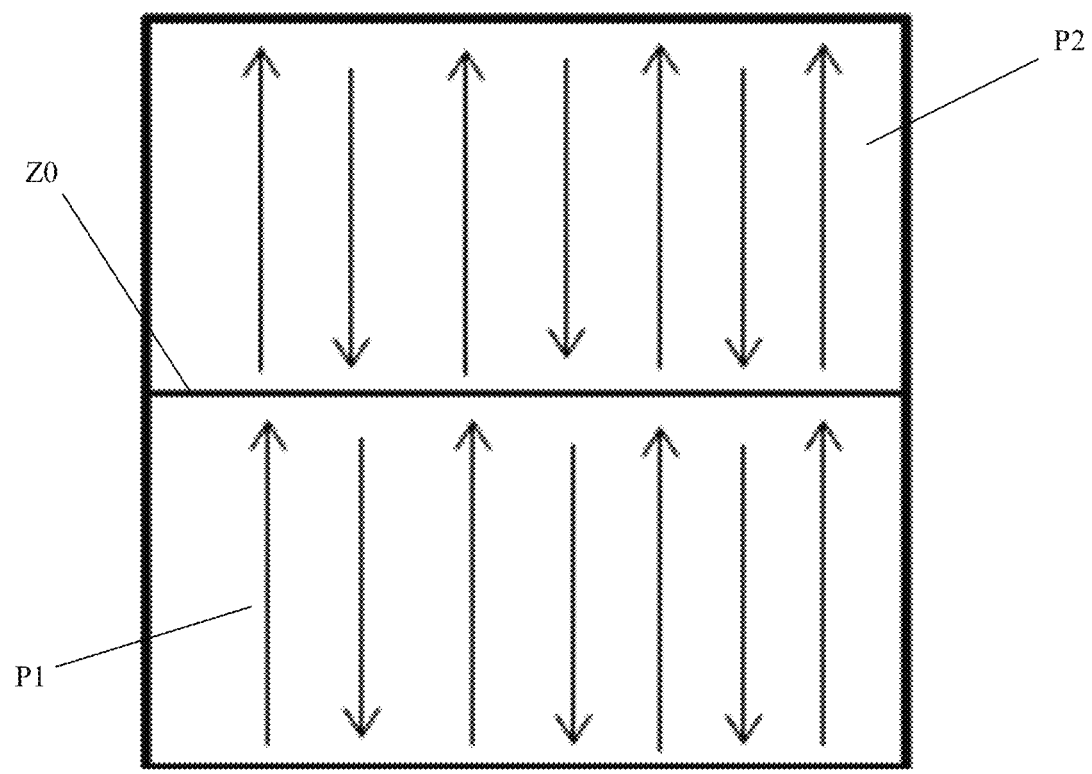
FIG. 5 is a schematic diagram of an exemplary laser scan strategy according to the first example.

The laser scan strategy in this example is shown in FIG. 5. The SLM shaping equipment used in this example adopts the laser pulse exposure mode, the shaping material adopts Hastelloy X alloy, and the size of the shaped SLM sample is 10 mm*10 mm*10 mm.

Setting the SLM process parameters for the pore defects also includes: the laser scan power P=200 W, the scan line dot spacing D=80 μm, and the scan line exposure time t=80 μs, wherein the scan line dot spacing D refers to the distance between two adjacent dots when the laser pulse moves in a dotted manner, and the scan line exposure time t refers to the time it takes to move between two adjacent dots when the laser pulse moves in a dotted manner;

the layer thickness d=30 μm, the scan pitch h=70 μm, and the width δ of strip lap-joint zone Z0=0.5 mm;

the strip width w0=5 mm, and the laser scan direction is 90°, forming one horizontally extending strip lap-joint zone Z0 with a length of 10 mm.

In this example, the above SLM process parameters for prefabricating pore defects are set in the 1500th to 1700th layers of the sample, so as to shape the sample by SLM.

Figure 6:
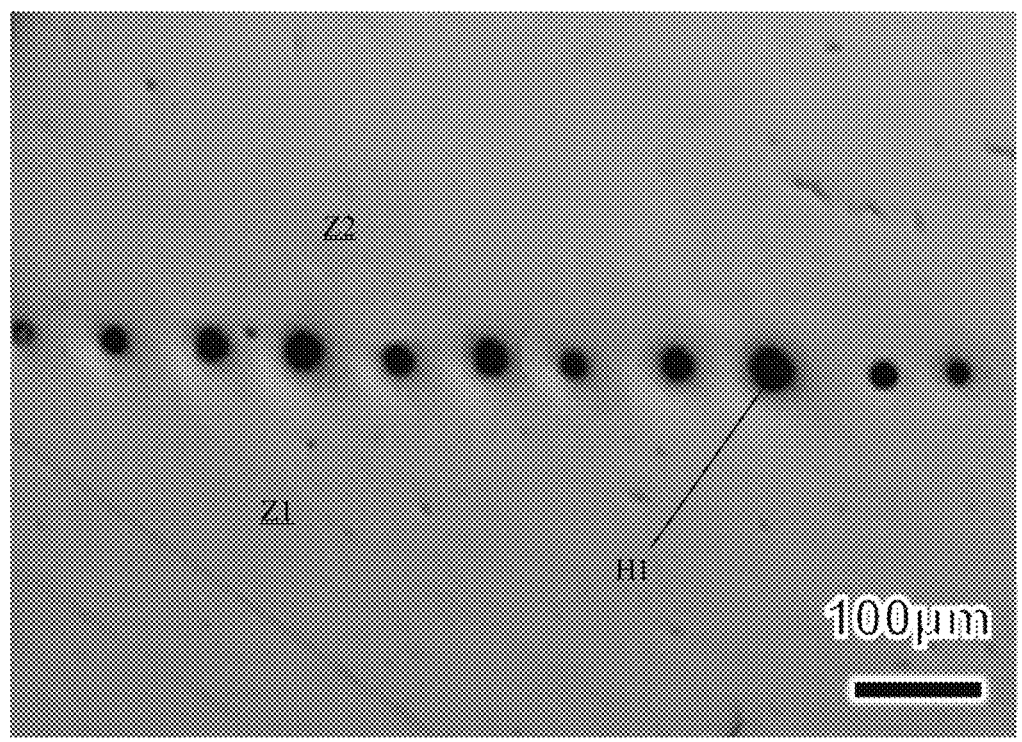
FIG. 6 is a pore distribution diagram obtained in the first example.

FIG. 6 is a pore distribution diagram of the sample with prefabricated pore defects obtained in this example, in which pores H1 are shown. The average value of the pore radius R formed in this example is about 25 μm. According to formula 1) $a=(N\times(\pi R^2)\times L/h)/S$, the pore defect proportion a of the obtained defect layer is approximately 0.34%.

Second Example

Figure 7:
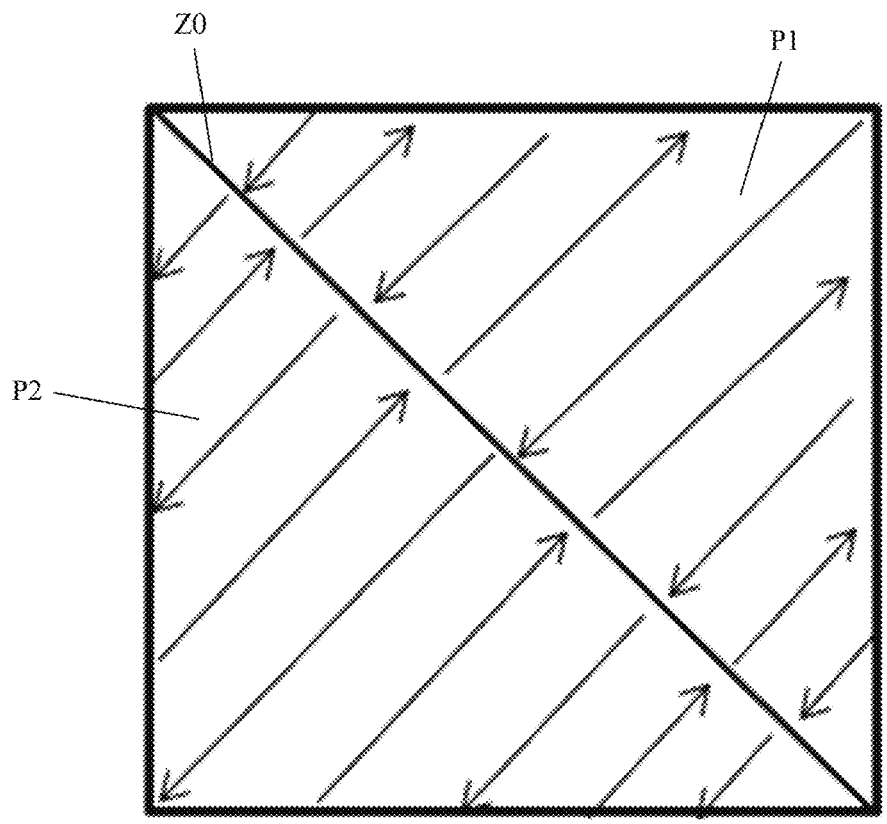
FIG. 7 is a schematic diagram of an exemplary laser scan strategy according to the second example.

The laser scan strategy in this example is shown in FIG. 7. The SLM shaping equipment used in this example adopts the laser pulse exposure mode, the shaping material adopts Hastelloy X alloy, and the size of the shaped SLM sample is 10 mm*10 mm*10 mm.

Setting the SLM process parameters for the pore defects also includes: the laser scan power P=180 W, the scan line dot spacing D=100 μm, and the scan line exposure time t=90 μs;

the layer thickness d=30 μm, the scan pitch h=100 μm, and the strip lap-joint amount δ=0.5 mm;

the strip width w0=7 mm, and the laser scan direction is 45°, forming one strip lap-joint zone Z0 with a length of 14.14 mm extending along a diagonal line.

In this example, the above SLM process parameters for prefabricating pore defects are set in the 1000th to 1100th layers of the sample, so as to shape the sample by SLM.

Figure 8:
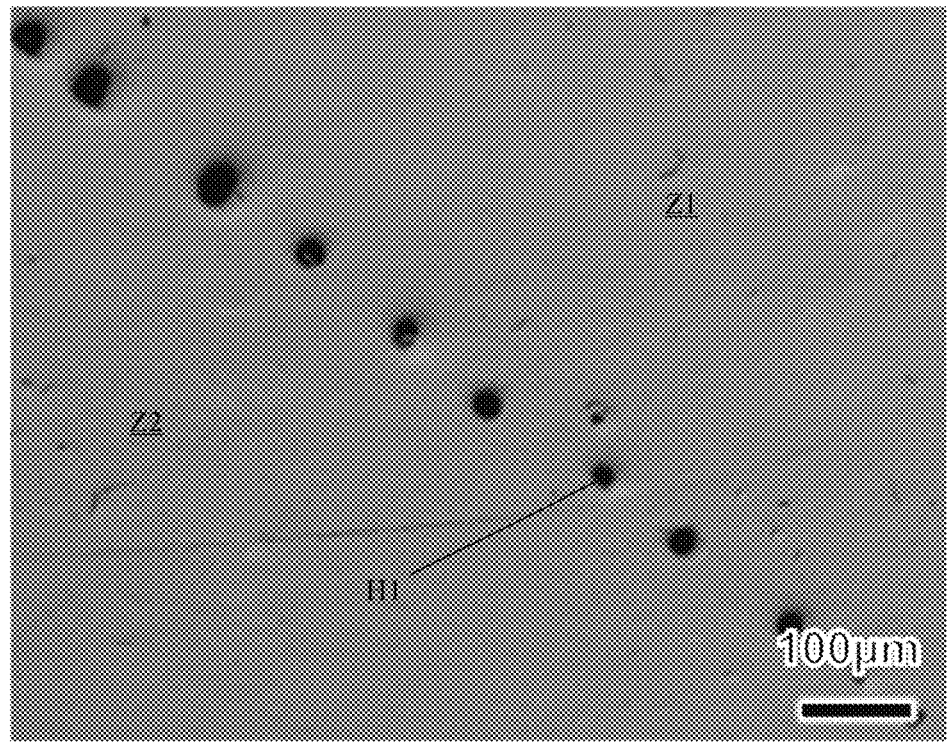
FIG. 8 is a pore distribution diagram obtained in the second example.

FIG. 8 is a pore distribution diagram of the sample with prefabricated pore defects obtained in this example, in which pores H1 are shown. The average value of the pore radius R formed in this example is about 25 μm. According to formula 1) $a=(N\times(\pi R^2)\times L/h)/S$, the pore defect proportion a of the obtained defect layer is approximately 0.28%.

Third Example

Figure 9:
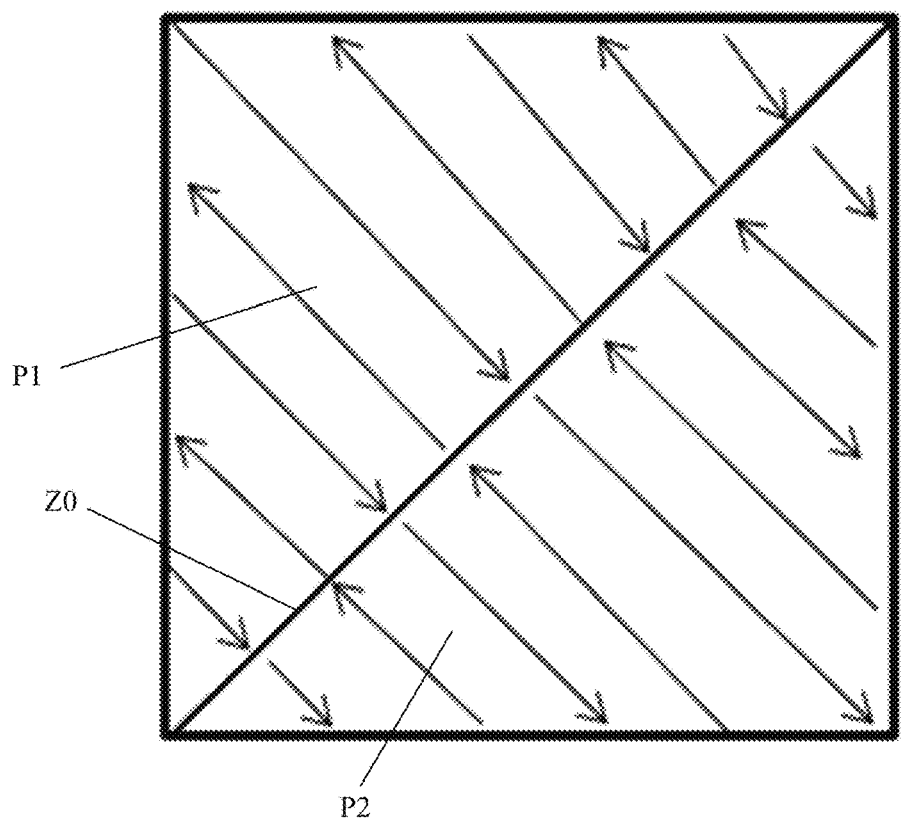
FIG. 9 is a schematic diagram of an exemplary laser scan strategy according to the third example.

The laser scan strategy in this example is shown in FIG. 9. The SLM shaping equipment used in this example adopts the laser pulse exposure mode, the shaping material adopts Hastelloy X alloy, and the size of the shaped SLM sample is 10 mm*10 mm*10 mm.

Setting the SLM process parameters for the pore defects also includes: the laser scan power P=210 W, the scan line dot spacing D=90 μm, and the scan line exposure time t=70 μs;

the layer thickness d=30 μm, the scan pitch h=90 μm, and the strip lap-joint amount δ=0.5 mm;

the strip width w0=7 mm, and the laser scan direction is −45°, forming one strip lap-joint zone Z0 with a length of 14.14 mm extending along another diagonal line.

In this example, the above SLM process parameters for prefabricating pore defects are set in the 1000th to 1100th layers of the sample, so as to shape the sample by SLM.

Figure 10:
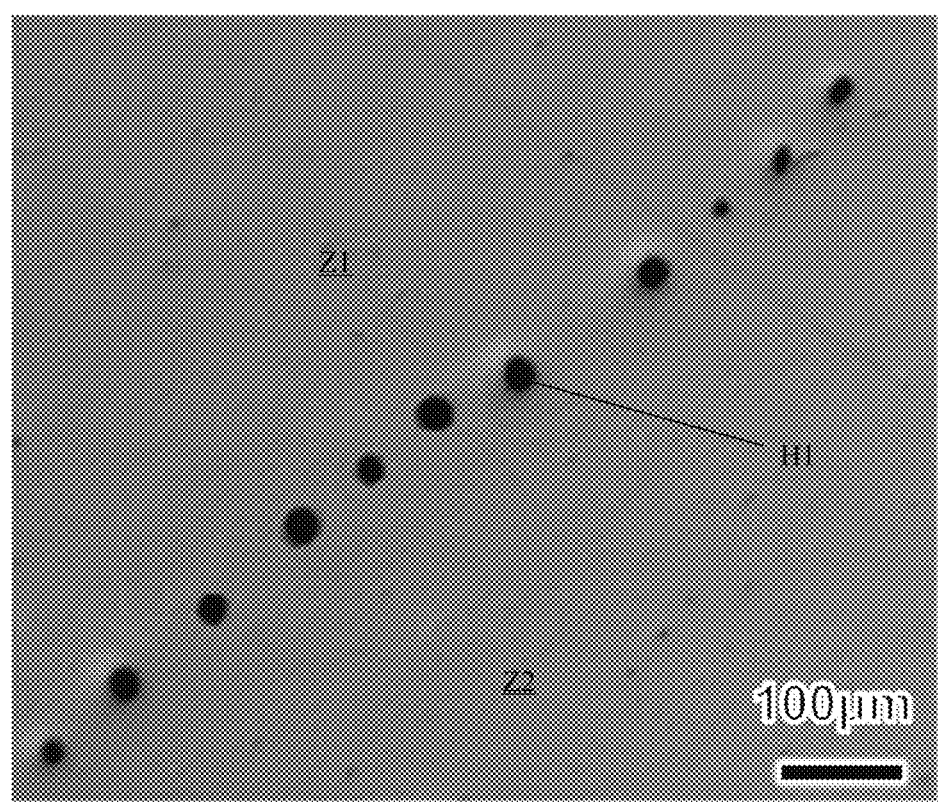
FIG. 10 is a pore distribution diagram obtained in the third example.

FIG. 10 is a pore distribution diagram of the sample with prefabricated pore defects obtained in this example, in which pores H1 are shown. The average value of the pore radius R formed in this example is about 25 μm. According to formula 1) $a=(N\times(\pi R^2)\times L/h)/S$, the pore defect proportion a of the obtained defect layer is approximately 0.31%.

Experiments show that among the SLM process parameters, the three parameters, namely laser scan power P, scan line dot spacing D and scan line exposure time t, have a greater influence on whether the keyhole effect is generated.

SLM process parameters are controlled as follows: the shaping material adopts Hastelloy X alloy; the laser scan power P=180-210 W; the scan line dot spacing D=80-100 μm; the scan line exposure time t=70-90 μs.

In addition, SLM process parameters are further controlled as follows: the layer thickness d=30 μm; the scan pitch h=70-100 μm; the strip lap-joint amount δ=0.5-0.9 mm.

Controlling the SLM process parameters within the above range can produce keyhole effects and obtain regular pore defects.

In practice, in conjunction with FIG. 3, the above pore defect prefabrication method can be performed as follows:

Control SLM process parameters as follows: the laser scan power P=180-210 W, the scan line dot spacing D=80-100 μm, and the scan line exposure time t=70-90 μs; the layer thickness d=30 μm, the scan pitch h=70-100 μm, and the strip lap joint amount δ=0.5-0.9 mm. The strip width w0 and the laser scan direction are set according to the set pore defect position.

Then, design the position and proportion of pore defects in the SLM part: the position, quantity and length of the strip lap-joint zone Z0 in the defect layer are controlled by changing the laser scan direction and the strip width, wherein the pore defect proportion a of the defect layer may be approximately determined according to formula (1). Then, by selecting one or more specified metal melt layers, the position of the pore defects in the height direction of the SLM part is thereby controlled.

Finally, perform 3D printing through the SLM process, set the above SLM process parameters for the above specified metal melt layer, and set normal process parameters for other metal melt layers, to obtain a SLM part with prefabricated pore defects.

The above pore defect prefabrication method can create a "keyhole effect" by controlling the SLM process parameters, thereby forming regular pore defects at the specified position of the SLM part. The above pore defect prefabrication method adopts the preferred SLM process parameters, sets the position of pore defects in the two-dimensional section of each layer of the SLM part by controlling the laser scan direction and strip width, and then sets the corresponding SLM process parameters in the specified metal melt layer of the SLM part, so that the prefabrication of the desired pore defects in the SLM part can be achieved.

The above pore defect prefabrication method also enables the pore defect proportion a of the defect layer to be determined with reference to the formula, so that each parameter can be easily adjusted to obtain the desired pore defect proportion.

It can be appreciated that, the above pore defect prefabrication method is not only be applicable to the case of prefabricating pores in non-destructive testing comparative samples, but also applicable to other situations where the influence of pore defects on SLM parts is deeply understood. For example, in the key positions of SLM parts or the typical characteristic samples thereof, pore defects can be prefabricated, so as to carry out strength assessment tests such as tensile, durability, fatigue, etc. to evaluate the influence of pore defects on mechanical properties and predict the service life of the components.

It should be appreciated that the accompanying drawings are only used as examples, not drawn according to the conditions of equal scale, and should not be taken as a limitation on the protection scope actually claimed in this disclosure. In addition, the variations in different embodiments can be appropriately combined.

Although this disclosure is disclosed above with preferred examples, it is not intended to limit this disclosure, and any skilled in the art can make variations and modifications without departing from the spirit and scope of this disclosure. Therefore, any modifications, equivalent variations and embellishments made to the above examples according to the technical essence of this disclosure without departing from the content of the technical solutions of this disclosure all fall within the protection scope defined by the claims of this disclosure.

The invention claimed is:

1. A method for controlling an SLM process to prefabricate pore defects, the method comprising:
   laser scanning a specified metal melt layer according to a first scan path; and
   laser scanning the specified metal melt layer according to a second scan path,
   wherein the first scan path and the second scan path have a path overlap zone, the path overlap zone has a predetermined width, and laser energy input superimposed in the path overlap zone is controlled to reach a predetermined energy value, whereby keyholes are formed at a plurality of positions in a lengthwise direction of the path overlap zone, the specified metal melt layer is taken as a defect layer, and the keyholes in the path overlap zone is taken as pore defects,
   wherein laser scanning along the first and second scan paths are each performed in a strip-type pattern using a pulse exposure mode,
   wherein the first scan path is located in a first strip zone, the second scan path is located in a second strip zone, the first strip zone and the second strip zone form a strip lap-joint zone, the strip lap-joint zone constitutes the path overlap zone, and a strip lap-joint amount of the strip lap-joint zone is a width of the path overlap zone, and
   wherein parameters of the SLM process are controlled such that a Nickel-Chromium-Iron-Molybdenum alloy is used as a shaping material; a laser scan power P is set between 180 W and 210 W, inclusive; a scan line dot spacing D is set between 80 μm and 100 μm, inclusive; and a scan line exposure time t is set between 70 μs and 90 μs, inclusive.

2. The method according to claim 1, wherein the first scan path comprises a plurality of first scan lines arranged in parallel and spaced equidistantly, the second scan path comprises a plurality of second scan lines arranged in parallel and spaced equidistantly, and scan pitches of the first scan path and the second scan path are the same.

3. The method according to claim 1, wherein laser scanning along the first and second scan paths are each performed in a strip-type reciprocating pattern.

4. The method according to claim 1, wherein parameters of the SLM process are further controlled such that a layer thickness d is set to 30 μm; a scan pitch h is set between 70 μm and 100 μm, inclusive; and a strip lap joint amount δ is set between 0.5 mm and 0.9 mm, inclusive.

5. The method according to claim 1, wherein position, quantity and length of the strip lap-joint zone in the defect layer are controlled by changing laser scan direction and strip widths of the first strip zone and/or the second strip zone, thereby controlling a pore defect proportion of the defect layer.

6. The method according to claim 2, wherein a pore defect proportion a of the defect layer is determined with reference to a following formula:

$$a=(N\times(\pi R^2)\times L/h)/S$$

wherein N is a quantity of the strip lap-joint zone, R is a pore radius, L is a length of the strip lap-joint zone, h is the scan pitch, and S is a sectional area of the defect layer.

* * * * *